United States Patent
Maes

(10) Patent No.: US 8,571,012 B2
(45) Date of Patent: *Oct. 29, 2013

(54) CUSTOMIZED SIP ROUTING TO CROSS FIREWALLS

(75) Inventor: Stephane H. Maes, Fremont, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1274 days.

This patent is subject to a terminal disclaimer.

(21) Appl. No.: 11/428,955

(22) Filed: Jul. 6, 2006

(65) Prior Publication Data

US 2007/0274504 A1 Nov. 29, 2007

Related U.S. Application Data

(63) Continuation-in-part of application No. 11/383,024, filed on May 12, 2006.

(51) Int. Cl.
*H04L 12/66* (2006.01)
(52) U.S. Cl.
USPC ........... 370/352; 370/356; 370/401; 370/351; 370/254; 370/392; 379/256.01; 709/204; 709/206; 709/229; 709/227
(58) Field of Classification Search
USPC .................. 370/352–356, 254, 392, 401; 379/265.01; 709/204, 206, 229, 227, 709/231
See application file for complete search history.

(56) References Cited

U.S. PATENT DOCUMENTS

| | | | |
|---|---|---|---|
| 7,372,840 B2 * | 5/2008 | Le et al. ................... 370/338 |
| 7,404,001 B2 | 7/2008 | Campbell et al. | |
| 7,590,692 B2 | 9/2009 | Van Dyke et al. | |
| 7,656,866 B2 | 2/2010 | Banner et al. | |
| 2002/0095599 A1 * | 7/2002 | Hong et al. ................. 713/201 |
| 2002/0103898 A1 * | 8/2002 | Moyer et al. ................ 709/224 |
| 2003/0105520 A1 | 6/2003 | Alferness et al. | |
| 2003/0145054 A1 | 7/2003 | Van Dyke | |
| 2004/0196867 A1 | 10/2004 | Ejzak et al. | |
| 2005/0050209 A1 * | 3/2005 | Main .......................... 709/229 |
| 2005/0060368 A1 | 3/2005 | Wang et al. | |
| 2005/0097222 A1 | 5/2005 | Jiang et al. | |

(Continued)

OTHER PUBLICATIONS

*Understanding SIP Today's Hottest Communications Protocol Comes of Age*, Ubiquity White Paper, 6 pages.

(Continued)

*Primary Examiner* — Asad Nawaz
*Assistant Examiner* — Khaled Kassim
(74) *Attorney, Agent, or Firm* — Kilpatrick Townsend & Stockton LLP

(57) ABSTRACT

Systems, methods, and machine-readable media are disclosed for providing customization to routing of messages in a system where routing is based on stored addresses, such as, for example, a Session Initiation Protocol (SIP) system, to pass through a firewall. In one embodiment, a method of providing customized routing of messages to pass through a firewall can comprise receiving a message from an initiating agent to a target communication identifier at a system for signaling between endpoints. The system can have one or more stored network addresses for each of a plurality of communication identifiers. One or more network addresses for the target endpoint can be determined from the stored network addresses associated to the communication identifier. One or more policies can be applied to the one or more network addresses for the target communication identifier to route the message through the firewall.

31 Claims, 8 Drawing Sheets

(56) References Cited

U.S. PATENT DOCUMENTS

| | | | |
|---|---|---|---|
| 2005/0111382 A1* | 5/2005 | Le et al. ................... | 370/254 |
| 2005/0198180 A1 | 9/2005 | Khanolkar et al. | |
| 2005/0198359 A1* | 9/2005 | Basani et al. ................ | 709/232 |
| 2006/0025156 A1 | 2/2006 | Campbell | |
| 2006/0075483 A1* | 4/2006 | Oberle et al. .................. | 726/14 |
| 2006/0083242 A1* | 4/2006 | Pulkkinen ................... | 370/392 |
| 2006/0098577 A1 | 5/2006 | MeLampy et al. | |
| 2006/0098625 A1* | 5/2006 | King et al. ................... | 370/352 |
| 2006/0146792 A1 | 7/2006 | Ramachandran et al. | |
| 2006/0153354 A1 | 7/2006 | Brahm et al. | |
| 2007/0016484 A1 | 1/2007 | Waters et al. | |
| 2007/0106724 A1 | 5/2007 | Gorti et al. | |
| 2007/0136422 A1 | 6/2007 | Ohtani et al. | |
| 2007/0168422 A1 | 7/2007 | Choe et al. | |
| 2007/0186002 A1 | 8/2007 | Campbell et al. | |
| 2007/0192410 A1 | 8/2007 | Liversidge et al. | |
| 2007/0276907 A1 | 11/2007 | Maes | |
| 2008/0165782 A1* | 7/2008 | Vizaei ........................ | 370/392 |
| 2008/0212499 A1 | 9/2008 | Maes | |
| 2009/0052435 A1* | 2/2009 | Nakamura et al. ............ | 370/352 |

OTHER PUBLICATIONS

U.S. Appl. No. 11/680,712, filed Mar. 1, 2007, Advisory Action mailed Jan. 10, 2011, 2 pages.

U.S. Appl. No. 11/680,712, filed Mar. 1, 2007, Office Action mailed Feb. 22, 2010, 15 pages.

U.S. Appl. No. 11/680,712, filed Mar. 1, 2007, Supplemental Office Action mailed May 4, 2010, 16 pages.

U.S. Appl. No. 11/383,024, filed May 12, 2006, Office Action mailed Aug. 26, 2010, 22 pages.

U.S. Appl. No. 11/680,712, filed Mar. 1, 2007, Final Office Action mailed Oct. 14, 2010, 17 pages.

U.S. Appl. No. 11/383,024, filed May 12, 2006, Office Action mailed Sep. 15, 2011, 18 pages.

U.S. Appl. No. 11/383,024, filed May 12, 2006, Final Office Action mailed May 23, 2012, 18 pages.

U.S. Appl. No. 11/383,024, filed May 12, 2006, Advisory Action mailed Sep. 12, 2012, 3 pages.

* cited by examiner

_US 8,571,012 B2_

CUSTOMIZED SIP ROUTING TO CROSS FIREWALLS

CROSS-REFERENCE TO RELATED APPLICATION

This application is a continuation-in-part of U.S. patent application Ser. No. 11/383,024, entitled "SIP Routing Customization", filed May 12, 2006, the details of which are herein incorporated by reference.

BACKGROUND OF THE INVENTION

Embodiments of the present invention relate generally to routing of messages in a network and more particularly to providing customization to routing of messages to pass through firewalls.

Session Initiation Protocol (SIP) is an application-layer signaling protocol commonly used for establishing sessions over an Internet Protocol (IP) network. Such a session can be used for a variety of purposes such as Internet telephony, e.g., Voice over Internet Protocol (VoIP), audio and/or video conferencing, interactive gaming, etc. Generally speaking, SIP can be used by an initiating device to request a location of another device to be contacted or connected.

The major components of a SIP system include a proxy, a registrar, and a location server. Generally speaking, a SIP endpoint device can register a current location, i.e. network address or target SIP Uniform Resource Identifier (URI) where a SIP message targeted to a SIP identifier or Address Of Record (AOR) should be sent, with the location server via the registrar using the SIP REGISTER message. Another device attempting to contact the first device can request the first device's AOR from the system via the proxy that converts a SIP address (e.g. Address of Record (AOR)) to the target SIP URI(s) and routes the messages accordingly. This is done by having the proxy request the address from the location server and route the message for the requester to the target SIP UIR(s).

Such a system allows an initiating device to easily locate and contact another device for SIP interactions. However, since this protocol depends upon the stored addresses of the location server for a SIP identifier or AOR, it is rather limited and inflexible. That is, the SIP proxy can only route a SIP message to the target SIP URI stored in the location server. The location server and proxy cannot modify the target URI or provide alternatives (single or multiple, in parallel or in series) based on a set of conditions. Some system allow storing multiple target URIs for an AOR but these then have a hard coded behavior for the resulting routing, typically either routing to a first one or routing to all in parallel (i.e. SIP forking/ Forking proxy). For example, the location server of a SIP system cannot select between multiple SIP URIs for a particular user based on preferences of that user or based on the user's presence or usage of one device. Rather, the location server is limited to simply providing the SIP URI saved during the registration step.

Furthermore, security features such as firewalls, while providing valuable benefits, can interfere with the exchange of legitimate messages or other communications. Particularly, while SIP is typically able to negotiate firewalls, sessions started using SIP may encounter problems dealing with these firewalls. For example, a streaming media session supported by a streaming protocol such as Real-time Transport Protocol (RTP) may not be able to pass through the firewall. Hence, there is a need for methods and systems that allow for customization of routing based on the saved SIP URI(s) and a set of one or more conditions or policies, i.e., in a programmable manner that can be executed at run-time, to provide routing of messages or sessions through firewalls.

BRIEF SUMMARY OF THE INVENTION

Systems, methods, and machine-readable media are disclosed for providing customization to routing of messages in a system where routing is based on stored addresses, such as, for example, a Session Initiation Protocol (SIP) system, to pass through a firewall. In one embodiment, a method of providing customized routing of messages to pass through a firewall can comprise receiving a message from an initiating agent to a target communication identifier at a system for signaling between endpoints. Such a message can comprise, for example, a SIP INVITE message. Later signaling message may be treated the same way i.e. responses and following exchanges. The system can have one or more stored network addresses for each of a plurality of communication identifiers. One or more network addresses for the target endpoint can be determined from the stored network addresses associated to the communication identifier. One or more policies can be applied to the one or more network addresses for the target communication identifier to route the message through the firewall. Applying one or more policies to the one or more network addresses for the target communication identifier to route the message through the firewall can comprise modifying the message to route the message through an open port of the firewall. Applying one or more policies to the one or more network addresses for the target communication identifier to route the message through the firewall can also comprise modifying the message to cause a reply to the message to be routed through the open port of the firewall. The one or more policies can be applied to the one or more network addresses for the target communication identifier by a customized proxy of the SIP system, a third-party call controller, or other device.

The method can further comprise receiving the reply to the message via the open port of the firewall, mapping the reply to the initiating agent, and sending the replay to the initiating agent. A determination can be made as to whether a session has been established between the initiating agent and the target communication identifier. In response to determining a session has been established, a streaming protocol can be switched to and a streaming session can be started between the initiating agent and the target communication identifier. The streaming protocol can comprise, for example, Session Description Protocol (SDP), Real-time Transport Protocol (RTP), or others.

According to another embodiment, a Session Initiation Protocol (SIP) system for providing customized routing of messages can comprise a target endpoint, an originating endpoint communicatively coupled with the target endpoint, and a firewall between the target endpoint and the originating endpoint. The system can also include a custom proxy communicatively coupled with the target endpoint and the originating endpoint. The custom proxy can be adapted to receive a message, such as a SIP INVITE message, from the originating endpoint to the target endpoint, determine one or more target SIP Uniform Resource Identifiers (URIs) for the target endpoint from stored addresses of record and apply one or more policies to the one or more target SIP Uniform Resource Identifiers (URIs) for the target endpoint to route the message through the firewall. The custom proxy can apply one or more policies to the one or more network addresses for the target endpoint to route the message through the firewall by modifying the message to route the message through an open port of the firewall. The custom proxy can also modify the message to cause a reply to the message to be routed through the open port of the firewall.

The custom proxy can be further adapted to receive the reply to the message via the open port of the firewall, map the reply to the initiating agent, and send the replay to the initiating agent. The custom proxy can also be adapted to determine whether a session has been established between the initiating agent and the target endpoint. In response to determining a session has been established, the custom proxy can switch to a streaming protocol and begin a streaming session between the initiating agent and the target endpoint. The streaming protocol can comprise Session Description Protocol (SDP) carried as a payload of SIP messages, Real-time Transport Protocol (RTP), or another protocol.

According to yet another embodiment, a Session Initiation Protocol (SIP) system for providing customized routing of messages can comprise a target endpoint, an originating endpoint communicatively coupled with the target endpoint, a firewall between the target endpoint and the originating endpoint, and a third-party call controller communicatively coupled with the target endpoint and the originating endpoint. The third-party call controller can be adapted to receive a message, such as a SIP INVITE message, from the originating endpoint to the target endpoint, determine one or more target SIP Uniform Resource Identifiers (URIs) for the target endpoint from stored addresses of record and apply one or more policies to the one or more target SIP Uniform Resource Identifiers (URIs) for the target endpoint to route the message through the firewall. The third-party call controller can apply one or more policies to the one or more network addresses for the target endpoint to route the message through the firewall by modifying the message to route the message through an open port of the firewall and/or by modifying the message to cause a reply to the message to be routed through the open port of the firewall.

The third-party call controller can be further adapted to receive the reply to the message via the open port of the firewall, map the reply to the initiating agent, and send the replay to the initiating agent. The third-party call controller can also be adapted to determine whether a session has been established between the initiating agent and the target endpoint. In response to determining a session has been established, the third-party call controller can switch to a streaming protocol and begin a streaming session between the initiating agent and the target endpoint. The streaming protocol can comprise Session Description Protocol (SDP), Real-time Transport Protocol (RTP), or another protocol.

DETAILED DESCRIPTION OF THE INVENTION

Figure 1:
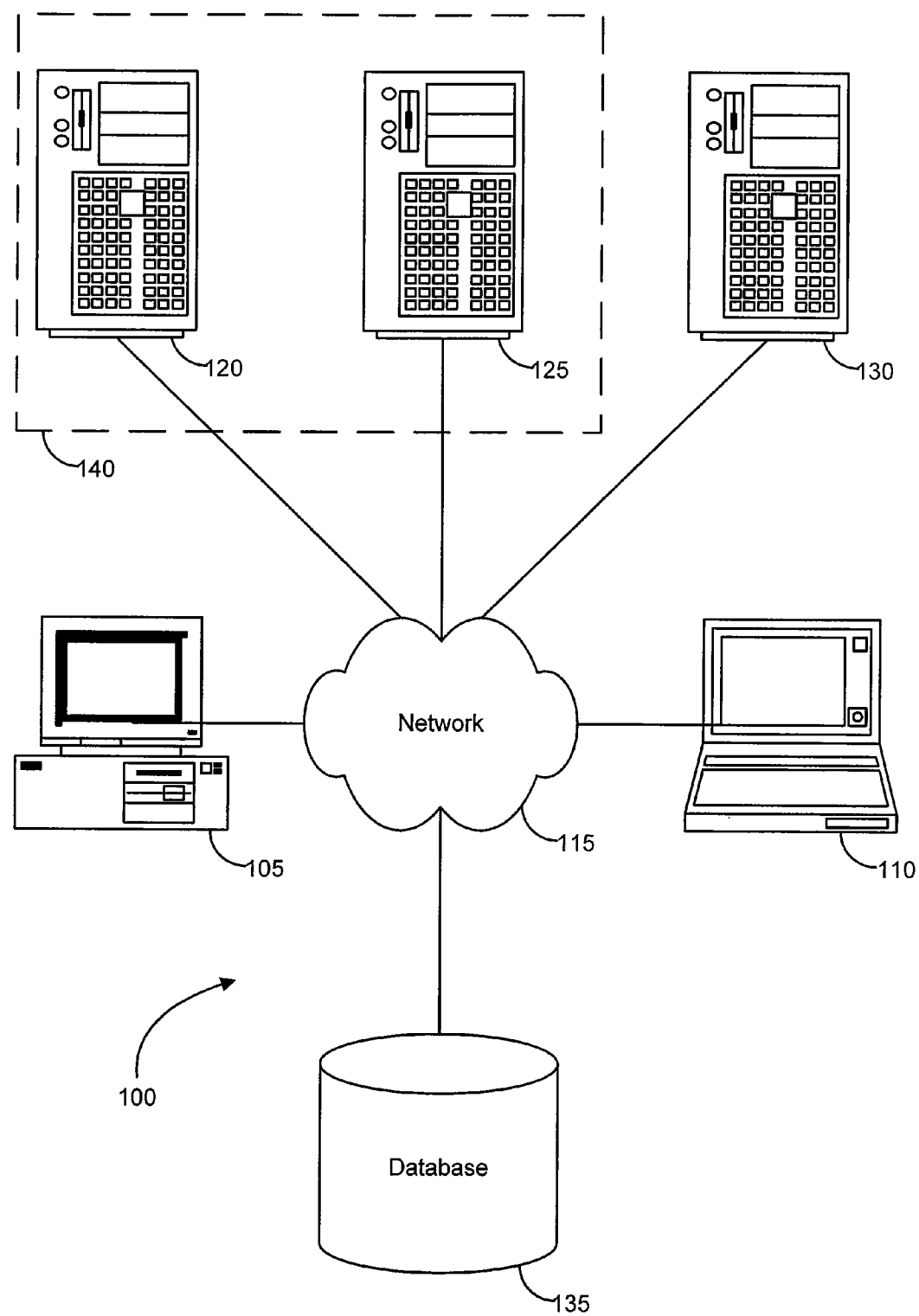
FIG. 1 is a block diagram illustrating components of an exemplary operating environment in which various embodiments of the present invention may be implemented.

In the following description, for the purposes of explanation, numerous specific details are set forth in order to provide a thorough understanding of various embodiments of the present invention. It will be apparent, however, to one skilled in the art that embodiments of the present invention may be practiced without some of these specific details. In other instances, well-known structures and devices are shown in block diagram form. Importantly, it should be noted that while described herein with reference to SIP, embodiments of the present invention are considered to be equally applicable to other protocols and should not be considered limited to use with SIP. More specifically, embodiments of the present invention are thought to be equally applicable to other protocols that use routing and discovery of stored target SIP URIs to setup communications or to setup data or streaming sessions. Furthermore, it should be noted that, while specific examples described herein relate to receiving and routing a request to initiate a communication, such examples should not be considered limiting. Rather, it should be understood that any message between endpoints using a suitable protocol can be routed using various embodiments of the present invention.

Embodiments of the present invention provide methods, system and machine-readable media for customization of routing of SIP invite and possibly any other subsequent SIP messages based on a set of one or more conditions in a system where routing is based on stored addresses, such as, for example, in a Session Initiation Protocol (SIP) system. Generally speaking, providing customized routing of messages can comprise receiving a request to establish a session with a target device or endpoint or other message at a system for signaling between endpoints. The system can have one or more stored target SIP URIs for each of a plurality of AORs/endpoints, e.g. devices. One or more target SIP URIs for the target AOR/device or endpoint can be determined from the stored addresses of record. One or more policies can be applied to requests to store and/or to access the one or more target SIP URIs for the target AOR/device or endpoint. These policies may change the target SIP URIs value(s) and produce series, parallel, or other scripts of target SIP URIs to be executed accordingly by the custom proxy/router. These or other policies may also be applied to the target SIP URI returned by the location server or it may be done at the level of the custom proxy on the returned value. The policies can include routing instructions, header manipulation and other scripts or policies to be enforced by the proxy. Embodiments of the present invention provide policies focusing on the path that the message seems to have taken and forcing follow-up responses and messages to follow the same path. The one or more policies can comprise a set of one or more conditions and one or more actions associated with each condition. The request to establish a session with the target device or endpoint or any other message or response can be routed based on results of applying the one or more policies to the one or more target SIP URIs for the target device or endpoint.

According to one embodiment, as will be discussed in detail below, a SIP core (i.e. an existing SIP infrastructure of proxy, registrar/location server and support transport layer etc. . . . ) can be modified to perform the method. As discussed herein, modifying a SIP core can comprise providing a custom proxy, a custom registrar, and a custom location server for performing the functions discussed below. In such a case, determining one or more target SIP URI for the target device or endpoint and applying one or more policies to requests for one or more target SIP URIs for the target device or endpoint can be performed by a customized location server while routing the request to establish a session with the target device or endpoint can be performed by a custom proxy of the SIP system. Policies can be applied when registering at the location server, when requesting addresses from the location server, and/or at the proxy when scripts or policies are passed from the location server in answer to a request. Note the policies of the latter type could remain on the proxy for the duration of a session and not just for one exchange. The request to establish a session with the target device or endpoint can be routed based on results of applying the one or more policies to the one or more target SIP URIs for the target device or endpoint based on any context (e.g. of the original request) and any other info from task delegated by the policy enforcement to other resources. That is, the target SIP URI can be modified by applying the policies to the address, e.g. input AOR or returned SIP URI(s). As will be seen, when the originating address is changed, the new apparent address may correspond to a proxy that maintains a state to then map later messages similarly e.g., so that the recipient thinks the proxy is the sender but corresponding to the expected AOR, etc. In some cases, the result may be a set of address to us in parallel or in series, or a script with address and conditions and actions around the addresses. For example, such a set of conditions and actions can define conditional routing based on the occurrence of an event, satisfaction of some condition, etc.

In some cases, these scripts may include instructions for header manipulations. For example, scripts can be provided to cause responses to be addressed to an AOR or pseudo AOR of sender. That is, it may be desired in some cases to not expose or to hide the actual URI/network address. Therefore, the message back from the target can be processed by the proxy to replace the message header or SIP URI with the AOR when it is sent back to requester or when an out-of-band SIP message is sent. According to one embodiment, changing the addresses can be done at the gateway that controls traffic to the agent (e.g. the router). Alternatively, this can be accomplished by routing peer to peer traffic through the proxy. This approach can be used even when clients want to do pure peer to peer. When the AOR is used, SIP responses can be returned to the proxy. Otherwise SIP messages may go directly to the sender or its proxy. Responses can also be processed with policies in a similar fashion.

According to an alternative embodiment, the method may be performed by a custom domain provided and utilized in conjunction with a standard SIP core, i.e., an unmodified infrastructure with its own proxy, registrar and location server. In such a case, the method can further include, prior to determining one or more target SIP URIs for the target AOR/device or endpoint, redirecting the request to a custom domain indicated by the request. Then, one or more target SIP URIs for the target AOR/device or endpoint can be determined and one or more policies can be applied to the one or more target SIP URIs for the target AOR/device or endpoint by a custom location server of the custom domain. The request to establish a session with the target AOR, device or endpoint can be routed by a custom proxy of the custom domain.

FIG. 1 is a block diagram illustrating components of an exemplary operating environment in which various embodiments of the present invention may be implemented. The system 100 can include one or more user computers 105, 110, which may be used to operate a client, whether a dedicate application, web browser, etc. The user computers 105, 110 can be general purpose personal computers (including, merely by way of example, personal computers and/or laptop computers running various versions of Microsoft Corp.'s Windows and/or Apple Corp.'s Macintosh operating systems) and/or workstation computers running any of a variety of commercially-available UNIX or UNIX-like operating systems (including without limitation, the variety of GNU/Linux operating systems). These user computers 105, 110 may also have any of a variety of applications, including one or more development systems, database client and/or server applications, and web browser applications. Alternatively, the user computers 105, 110 may be any other electronic device, such as a thin-client computer, Internet-enabled mobile telephone, and/or personal digital assistant, capable of communicating via a network (e.g., the network 115 described below) and/or displaying and navigating web pages or other types of electronic documents. Although the exemplary system 100 is shown with two user computers, any number of user computers may be supported.

In some embodiments, the system 100 may also include a network 115. The network may can be any type of network familiar to those skilled in the art that can support data communications using any of a variety of commercially-available protocols, including without limitation TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth protocol known in the art, and/or any other wireless protocol); and/or any combination of these and/or other networks such as GSM, GPRS, EDGE, UMTS, 3G, 2.5 G, CDMA, CDMA2000, WCDMA, EVDO etc.

The system may also include one or more server computers 120, 125, 130 which can be general purpose computers and/or specialized server computers (including, merely by way of example, PC servers, UNIX servers, mid-range servers, mainframe computers rack-mounted servers, etc.). One or more of the servers (e.g., 130) may be dedicated to running applications, such as a business application, a web server, application server, etc. Such servers may be used to process requests from user computers 105, 110. The applications can also include any number of applications for controlling access to resources of the servers 120, 125, 130.

The web server can be running an operating system including any of those discussed above, as well as any commercially-available server operating systems. The web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 105, 110. As one example, a server may execute one or more web applications. The web application may be implemented as one or more scripts or programs written in any programming language, such as Java™, C, C# or C++, and/or any scripting language, such as Perl, Python, or TCL, as well as combinations of any programming/scripting languages. The server(s) may also include database servers, including without limitation those commercially available from Oracle, Microsoft, Sybase™, IBM™ and the like, which can process requests from database clients running on a user computer 105, 110.

In some embodiments, an application server may create web pages dynamically for displaying on an end-user (client) system. The web pages created by the web application server may be forwarded to a user computer 105 via a web server. Similarly, the web server can receive web page requests and/or input data from a user computer and can forward the web page requests and/or input data to an application and/or a database server. Those skilled in the art will recognize that the functions described with respect to various types of servers may be performed by a single server and/or a plurality of specialized servers, depending on implementation-specific needs and parameters.

The system 100 may also include one or more databases 135. The database(s) 135 may reside in a variety of locations. By way of example, a database 135 may reside on a storage medium local to (and/or resident in) one or more of the computers 105, 110, 115, 125, 130. Alternatively, it may be remote from any or all of the computers 105, 110, 115, 125, 130, and/or in communication (e.g., via the network 120) with one or more of these. In a particular set of embodiments, the database 135 may reside in a storage-area network ("SAN") familiar to those skilled in the art. Similarly, any necessary files for performing the functions attributed to the computers 105, 110, 115, 125, 130 may be stored locally on the respective computer and/or remotely, as appropriate. In one set of embodiments, the database 135 may be a relational database, such as Oracle 10g, that is adapted to store, update, and retrieve data in response to SQL-formatted commands.

Figure 2:
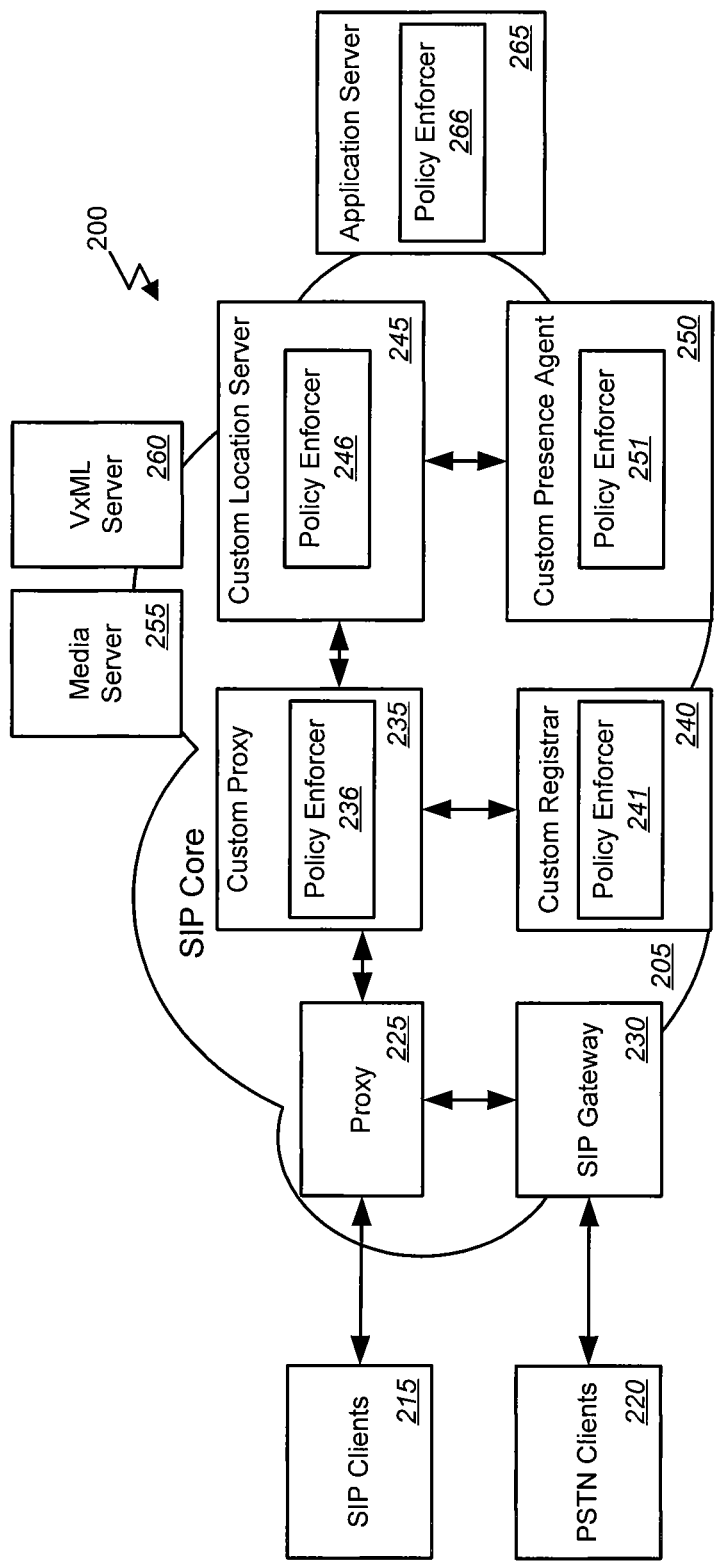
FIG. 2 is a block diagram illustrating functional components of a system for providing customization of routing based on a set of one or more conditions according to one embodiment of the present invention.

FIG. 2 is a block diagram illustrating functional components of a system for providing customization of routing based on a set of one or more conditions according to one embodiment of the present invention. This example represents, conceptually, components that may be implemented in an environment such as described above with reference to FIG. 1 or any other suitable environment for routing messages based on a set of stored addresses.

In this example, the system 200 includes a SIP core 205 and a number of clients such as SIP clients 215, Public Switched Telephone Network (PTSN) clients 220, etc. The SIP core 205 can provide access to one or more servers 255-265 and/or can route messages or signals between the clients 210-220 and/or the servers 255-265. As is common, the SIP core 205 can receive messages or signals from the clients via a proxy 225 or, as in the case of PSTN clients, via a SIP gateway 230 and the proxy 225.

According to one embodiment, the SIP core 205 can also include a number of customized or modified components such as a custom proxy 235 and a custom location server 245. The system can further comprise a custom registrar 240 adapted to store one or more addresses of record for the endpoints such as client devices, servers etc. However, rather than storing a single target SIP URI as is common with a typical SIP registrar, the custom registrar 240 can be adapted to store multiple target SIP URIs. Additionally or alternatively, the custom registrar 240 may be adapted to store, set, or otherwise modify one or more policies related to the target SIP URIs. According to one embodiment, the components for providing such customization may be implemented in an application server 265. That is, the custom elements, i.e., the custom registrar 240, custom proxy 235, custom location server 245, and custom presence agent 250, can be implemented as one or more applications executing on an application server 265 and available to the SIP core 205.

The custom proxy 235 can be adapted to receive a request, for example via proxy 225, to establish a session with a target device. The customized location server 245 can be adapted to determine, in response to receiving a query from the custom proxy 235, one or more target SIP URIs for the target AOR/device from stored target SIP URIs or policy scripts executed by the custom proxy 235. The customized location server 245 can also be adapted to apply one or more policies to the one or more SIP URIs for the target AOR/device via a policy enforcement module 246. Alternatively or additionally, these policies can be applied by any or all of a policy enforcement module 236 of the custom proxy 235, a policy enforcement module 241 of the custom registrar 240, a policy enforcement module 251 of the custom presence agent, and/or a policy enforcement module 266 of the application server 265. That is, rather than simply returning a discovered target SIP URI, the customized location server 245 can apply policies to the target SIP URI(s) to modify the target SIP URI(s) returned. As will be seen, this provides much greater flexibility and functionality over the standard SIP location server.

The one or more policies applied by the customized location server 245 can comprise a set of one or more conditions and one or more actions associated with each condition. For example, the one or more policies can include one or more conditions based on preferences for a user of the target endpoint, one or more conditions based on calendar information for a user of the target endpoint, one or more conditions based on presence of a user on the target endpoint or another endpoint, one or more conditions based on a user of the target endpoint being authenticated, one or more conditions based on a user of the target endpoint being authorized to receive a message, such as by having paid a fee. In such a case, a check can be performed to determine whether the sender is authorized to send based on having paid a fee, not being blacklisted, being authorized by the target user, etc.

Determining one or more target SIP URIs for the target AOR/endpoint and applying one or more policies to request one or more target SIP URIs for the target AOR/endpoint can be performed by the customized location server 245 while routing the request to establish a session with the target endpoint can be performed by the custom proxy 235 of the SIP system. Policies can be applied when registering at the custom location server 245, when requesting addresses from the custom location server 245, and/or at the custom proxy 235 when scripts or policies are passed from the custom location server 245 in answer to a request. It should be noted that the policies of the latter type can remain on the custom proxy 245 for the duration of a session or for one exchange. For caching purpose, they could stay longer. In some environments, the policies could be cached across sessions and endpoints or even be pre-compiled in the custom proxy 235.

Therefore, when registering, the custom registrar 240 can load information into the custom location server 245. A policy may apply to this information and can result in changing the target SIP URI. Alternatively, the metadata can be associated with the target SIP URI defining policies that are specific to it, if any. This may be based on how, when and who registered, information passed during registration (e.g. via SIP header as a URI), etc.

When an endpoint requests a target SIP URI, such as be issuing a message to another endpoint, the custom location server 245 can return the target SIP URI, a modified target SIP URI, a list of target SIP URIs with a navigation flow (e.g. parallel (e.g. SIP forking), series, . . . ), or a script to run on the custom proxy 235 that can be passed with the target SIP URI (as metadata) or instead of the target SIP URI. Alternatively, if policy enforcement is done in the custom proxy 235, then nothing needs to be passed. As noted above, scripts may includes routing scripts as well as header manipulation instructions as well as any other operation described in the policy. The custom proxy 235 may execute policies that it has locally (e.g., loaded by administrator) or that it has obtained as a script with or instead of target SIP URIs when interrogating the custom location server 245. These policies may apply also on firewall/media gateway—i.e. on the media stream as with a Realtime Transfer Protocol (RTP) programmable/policy based firewall. The firewall may check with the proxy or policy enforcer to determine if a policy applies the media stream between IP addresses and ports that are involved.

When the custom proxy 235 is present for a session, the custom proxy 235 can act as a B2B User Agent or as a third party call control between the endpoints. In the latter case, it acts like a middleman and it behaves for each endpoint as if it was the other endpoint. In this way, all messages come back and forth to the custom proxy 235. As such, the custom proxy 235 updates headers and addresses of the messages appropriately. In the former case header manipulation takes place to ensure that responses pass through.

In some cases, the system 200 may also have a custom presence agent 250 adapted to determine presence of a user on the target endpoint or another endpoint. That is, by monitoring various endpoints and/or messages, the custom presence agent 250 can detect the use of one of the endpoints. Furthermore, the custom presence agent 250 can be adapted to influence application of the one or more policies to the one or more AORs for the target endpoint by the customized location server 245 based on the presence of the user. So, for example, the policy can request to check presence of the user through the custom presence agent 250 and change the target SIP URI(s) returned accordingly. The custom presence agent 250 or presence server can be a user agent that can apply policies on any: subscription, updates or publications. A custom presence agent 250 or presence server can be interrogated with the location server and deal with responses that may be about multiple target SIP URIs or policies themselves to determine presence updates or to run for the particular principal presence. For example, the custom presence agent 250 can determine how to determine what presence attributes to update if the principal uses different devices with different states, when to update based, for example, on preferences, when to use or route other messages (e.g. email, SMS, or others), etc. Alternatively, this endpoint may be considered busy and another target SIP URI may be selected as the first to contact. This can be accomplished by the proxy executing the target SIP URI(s) or script/policy appropriately. That is, the proxy can detect the failed message and issue a new one if prescribed by the target SIP URIs or by the received policy script. It should be noted that the proxy can also act as a SIP forking proxy and act per the policies on messages to allow multiple endpoints to receive invite or other messages and to interact.

The custom proxy 235 can be further adapted to route the request to establish a session with the target device based on results of the customized location server 245 applying the one or more policies to the one or more target SIP URIs for the target device. That is, rather than simply routing to a discovered target SIP URI returned by the location server, the custom proxy can be adapted to deal with multiple target SIP URIs or policy/scripts returned by the custom location server 245. For example, the custom location server 245, after applying policies to the stored target SIP URIs for a particular device may return multiple target SIP URIs to be contacted, perhaps even in a specified order. The custom proxy 235 can be adapted to route messages to each device represented by the target SIP URIs in a manner indicated by the custom location server 245 (e.g. SIP forking or other behaviors).

Therefore, rather than simply returning a stored target SIP URI in response to a signal or message, the custom proxy 235 and customized location server 245, as well as the custom registrar 240 and/or custom presence agent 250 in some cases, provide for the application of one or more policies to the target SIP URIs. As mentioned above, the policies can comprise one or more conditions for each target SIP URIs with one or more rules associated with each condition. Such conditions and rules can take a wide variety of forms to perform any number of different tasks. Some possibilities are now offered by way of example and not limitation.

According to one embodiment, the system 200 can, as mentioned above, provide presence based routing. That is, the custom location server 245 can have a policy to check the presence and decide what target SIP URI(s) to return accordingly. So, for example, the custom location server 245 can subscribe to the custom presence agent 250. Changes of presence can be reflected in the custom location server 245 as, for example, metadata passed to the custom location server from the custom presence agent. This allows the custom location server 245 to respond faster without having to make a query. In such cases, policies associated with presence updates may be implemented to change the stored target SIP URIs. In another embodiment, the system 200 can check user preferences and, based on these preferences, return one or more target SIP URIs to invite in parallel, sequentially, or conditionally sequentially to implement for example: a group invite; a "Follow me" function; a "Find me" or "Hunt" function; etc. Furthermore, the preferences and/or presence information, together or individually, may provide for a guess of a "best" AOR based on calendar and/or other information and/or based on physical location derived otherwise and made available in a physical location server. According to one embodiment, these functions can be achieved by the custom proxy based on the policy or scripted returned by the custom location server when an target SIP URI is requested.

In another example, the system 200 can provide for authenticating and/or authorizing requests. For example, the system 200 may return no target SIP URI, i.e., a rejection message, if the requestor and/or the target are not authentic and/or authorized to transact on the system. In some cases, authorization may be based on the requestor and/or the target paying a fee for the transaction or service, or preferences. Alternatively or additionally, authorization may be based on privacy rules, such as those defining who can access the information, or preferences, such as those defining a "do not disturb" period between specified times, or when the user is on a specified system, or when the user is at home, etc. In the case of paying a fee, the service provider managing the system 200 may charge for an invite or message, may require subscription, or check successful charging (pre-pay) or check for successful reserve (post pay/credit card payments) or check account status etc. In such a case, the custom location server 245 may, for example, pass a charging request to a charging enabler that generates a charging record to a billing or payment system and check the results.

In other embodiments, the system 200 may additionally or alternatively log signals to and/or from the custom proxy 235. In some cases, the system 200 may anonymize requests with respect to the requestor and/or the target. So, in general, the system 200 can execute policies that affect the target SIP URI, or other data in the system 200.

However, the example illustrated in FIG. 2 assumes that the SIP core can be modified to provide such features. In many cases, the SIP core is provided as part of an existing network or network element and cannot be easily modified. Therefore, the following alternative is presented for adding the features discussed above to an existing SIP implementation without modifying the SIP core.

Figure 3:
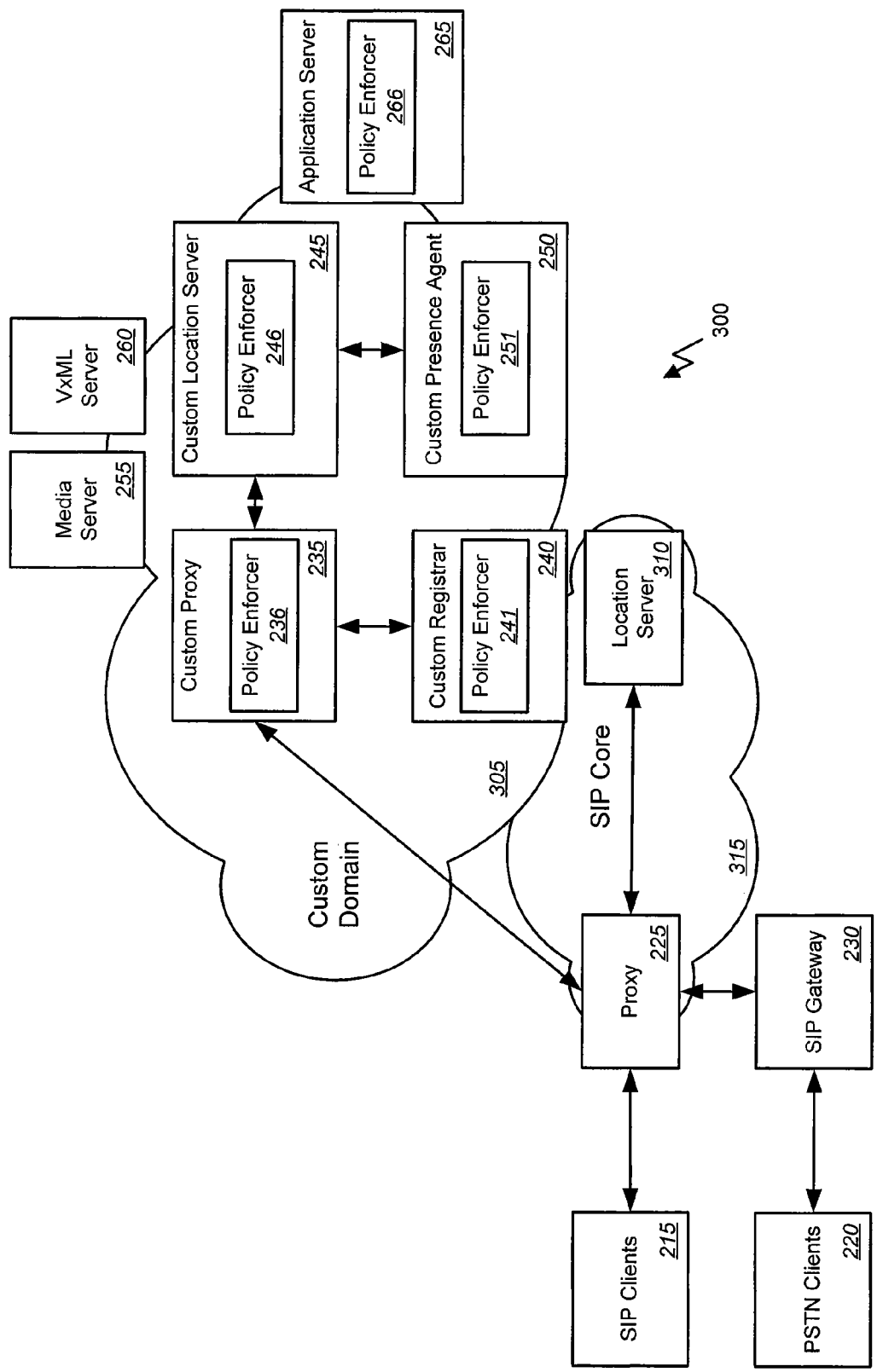
FIG. 3 is a block diagram illustrating functional components of a system for providing customization of routing based on a set of one or more conditions according to an alternative embodiment of the present invention.

FIG. 3 is a block diagram illustrating functional components of a system for providing customization of routing based on a set of one or more conditions according to an alternative embodiment of the present invention. This example illustrates an existing, unmodified SIP core 315. As in the previous example, the system 300 also includes a number of clients such as SIP clients 215, Public Switched Telephone Network (PTSN) clients 220, etc. As is common, the SIP core 315 can receive messages or signals from the clients via a proxy 225 or, as in the case of PSTN clients 220, via a SIP gateway 230 and the proxy 225. Also as is common, the requests can be routed based on AORs discovered and provided by the location server 310.

According to one embodiment, the target SIP URIs stored in or by the location server 310 can include those pointing to a custom domain 305. That is, an target SIP URI can be stored in the SIP core 315 in the conventional manner, i.e., via a SIP registrar. However, rather than pointing to an end device, the target SIP URI can point to the custom domain 305 and cause the proxy 225 of the SIP core to route or redirect the request to the custom domain 305.

The custom domain 305 can include a number of customized components such as a custom proxy 235 and a custom location server 245. The custom domain 305 can further comprise a custom registrar 240 adapted to store one or more addresses of record for the target device or other devices. That is, the custom components, i.e., the custom proxy 235, custom location server 245, custom registrar 240, and custom presence agent 250, for providing custom routing as discussed above can be implemented in the custom domain 305 rather than by modifying the SIP core 315. However, the custom components of the custom domain 305 can then provide the same functions of custom routing as discussed above with reference to FIG. 2.

That is, rather than storing a single target SIP URI as is common with a typical SIP registrar, the custom registrar 240 of the custom domain 305 can be adapted to store multiple target SIP URIs. Additionally or alternatively, the custom registrar 240 may be adapted to store, set, or otherwise modify one or more policies related to the target SIP URIs. According to one embodiment, the components for providing such customization may be implemented in an application server 265. That is, the custom elements, i.e., the custom registrar 240, custom proxy 235, custom location server 245, and custom presence agent 250, can be implemented as one or more applications executing on an application server 265 and available to the custom domain 305.

According to one embodiment, the target SIP URIs stored in or by the location server 310 of the SIP core 315 can include those pointing to the custom domain 305. That is, a target SIP URI can be stored in the location server 310 of the SIP core 315 in the conventional manner, i.e., via a SIP registrar. However, rather than pointing to an endpoint, the target SIP URI can point to the custom domain 305 and cause the proxy 225 of the SIP core to route or redirect the request to the custom domain 305.

The custom proxy 235 of the custom domain 305 can be adapted to receive a request, for example via proxy 225, to establish a session with a target device. The customized location server 245 can be adapted to determine, in response to receiving a query from the custom proxy 235, one or more target SIP URIs for the target AOR/device from stored target SIP URIs or policy scripts executed by the custom proxy 235. The customized location server 245 can also be adapted to apply one or more policies to the one or more SIP URIs for the target AOR/device via a policy enforcement module 246. Alternatively or additionally, these policies can be applied by any or all of a policy enforcement module 236 of the custom proxy 235, a policy enforcement module 241 of the custom registrar 240, a policy enforcement module 251 of the custom presence agent, and/or a policy enforcement module 266 of the application server 265. That is, rather than simply returning a discovered target SIP URI, the customized location server 245 can apply policies to the target SIP URI(s) to modify the target SIP URI(s) returned. As will be seen, this provides much greater flexibility and functionality over the standard SIP location server.

The one or more policies applied by the customized location server 245 can comprise a set of one or more conditions and one or more actions associated with each condition. For example, the one or more policies can include one or more conditions based on preferences for a user of the target endpoint, one or more conditions based on calendar information for a user of the target endpoint, one or more conditions based on presence of a user on the target endpoint or another endpoint, one or more conditions based on a user of the target endpoint being authenticated, one or more conditions based on a user of the target endpoint being authorized to receive a message, such as by having paid a fee. In such a case, a check can be performed to determine whether the sender is authorized to send based on having paid a fee, not being blacklisted, being authorized by the target user, etc.

Determining one or more target SIP URIs for the target AOR/endpoint and applying one or more policies to request one or more target SIP URIs for the target AOR/endpoint can be performed by the customized location server 245 while routing the request to establish a session with the target endpoint can be performed by the custom proxy 235 of the custom domain 305 via the proxy 225 of the SIP core 315. Policies can be applied when registering at the custom location server 245, when requesting addresses from the custom location server 245, and/or at the custom proxy 235 when scripts or policies are passed from the custom location server 245 in answer to a request. It should be noted that the policies of the latter type can remain on the custom proxy 245 for the duration of a session or for one exchange. For caching purpose, they could stay longer. In some environments, the policies could be cached across sessions and endpoints or even be pre-compiled in the custom proxy 235.

Therefore, when registering, the custom registrar 240 can load information into the custom location server 245. A policy may apply to this information and can result in changing the target SIP URI. Alternatively, the metadata can be associated with the target SIP URI defining policies that are specific to it, if any. This may be based on how, when and who registered, information passed during registration (e.g. via SIP header as a URI), etc.

When an endpoint requests a target SIP URI, such as be issuing a message to another endpoint, the custom location server 245 can return the target SIP URI, a modified target SIP URI, a list of target SIP URIs with a navigation flow (e.g. parallel (e.g. SIP forking), series, . . . ), or a script to run on the custom proxy 235 that can be passed with the target SIP URI (as metadata) or instead of the target SIP URI. Alternatively, if policy enforcement is done in the custom proxy 235, then nothing needs to be passed. As noted above, scripts may includes routing scripts as well as header manipulation instructions as well as any other operation described in the policy. The custom proxy 235 may execute policies that it has locally (e.g., loaded by administrator) or that it has obtained as a script with or instead of target SIP URIs when interrogating the custom location server 245. These policies may apply also on firewall/media gateway—i.e. on the media stream as with a Realtime Transfer Protocol (RTP) programmable/policy based firewall. The firewall may check with the proxy or policy enforcer to determine if a policy applies the media stream between IP addresses and ports that are involved.

When the custom proxy 235 is present for a session, the custom proxy 235 can act as a B2B User Agent or as a third party call control between the endpoints. In the latter case, it acts like a middleman and it behaves for each endpoint as if it was the other endpoint. In this way, all messages come back and forth to the custom proxy 235. As such, the custom proxy 235 updates headers and addresses of the messages appropriately. In the former case header manipulation takes place to ensure that responses pass through.

In some cases, the system 200 may also have a custom presence agent 250 adapted to determine presence of a user on the target endpoint or another endpoint. That is, by monitoring various endpoints and/or messages, the custom presence agent 250 can detect the use of one of the endpoints. Furthermore, the custom presence agent 250 can be adapted to influence application of the one or more policies to the one or more AORs for the target endpoint by the customized location server 245 based on the presence of the user. So, for example, the policy can request to check presence of the user through the custom presence agent 250 and change the target SIP URI(s) returned accordingly. The custom presence agent 250 or presence server can be a user agent that can apply policies on any: subscription, updates or publications. A custom presence agent 250 or presence server can be interrogated with the location server and deal with responses that may be about multiple target SIP URIs or policies themselves to determine presence updates or to run for the particular principal presence. For example, the custom presence agent 250 can determine how to determine what presence attributes to update if the principal uses different devices with different states, when to update based, for example, on preferences, when to use or route other messages (e.g. email, SMS, or others), etc. Alternatively, this endpoint may be considered busy and another target SIP URI may be selected as the first to contact. This can be accomplished by the proxy executing the target SIP URI(s) or script/policy appropriately. That is, the proxy can detect the failed message and issue a new one if prescribed by the target SIP URIs or by the received policy script. It should be noted that the proxy can also act as a SIP forking proxy and act per the policies on messages to allow multiple endpoints to receive invite or other messages and to interact.

The custom proxy 235 can be further adapted to route the request to establish a session with the target device based on results of the customized location server 245 applying the one or more policies to the one or more target SIP URIs for the target device. That is, rather than simply routing to a discovered target SIP URI returned by the location server, the custom proxy can be adapted to deal with multiple target SIP URIs or policy/scripts returned by the custom location server 245. For example, the custom location server 245, after applying policies to the stored target SIP URIs for a particular device may return multiple target SIP URIs to be contacted, perhaps even in a specified order. The custom proxy 235 can be adapted to route messages to each device represented by the target SIP URIs in a manner indicated by the custom location server 245 (e.g. SIP forking or other behaviors).

Therefore, rather than simply returning a stored target SIP URI in response to a signal or message, the custom proxy 235 and customized location server 245, as well as the custom registrar 240 and/or custom presence agent 250 in some cases, provide for the application of one or more policies to the target SIP URIs. As mentioned above, the policies can comprise one or more conditions for each target SIP URIs with one or more rules associated with each condition. Such conditions and rules can take a wide variety of forms to perform any number of different tasks. Some possibilities are now offered by way of example and not limitation.

According to one embodiment, the system 200 can, as mentioned above, provide presence based routing. That is, the custom location server 245 can have a policy to check the presence and decide what target SIP URI(s) to return accordingly. So, for example, the custom location server 245 can subscribe to the custom presence agent 250. Changes of presence can be reflected in the custom location server 245 as, for example, metadata passed to the custom location server from the custom presence agent. This allows the custom location server 245 to respond faster without having to make a query. In such cases, policies associated with presence updates may be implemented to change the stored target SIP URIs. In another embodiment, the system 200 can check user preferences and, based on these preferences, return one or more target SIP URIs to invite in parallel, sequentially, or conditionally sequentially to implement for example: a group invite; a "Follow me" function; a "Find me" or "Hunt" function; etc. Furthermore, the preferences and/or presence information, together or individually, may provide for a guess of a "best" AOR based on calendar and/or other information and/or based on physical location derived otherwise and made available in a physical location server. According to one embodiment, these functions can be achieved by the custom proxy based on the policy or scripted returned by the custom location server when an target SIP URI is requested.

In another example, the custom domain 305 can provide for authenticating and/or authorizing requests. For example, the custom domain 305 may return no target SIP URI, i.e., a rejection message, if the requester and/or the target are not authentic and/or authorized to transact on the system. In some cases, authorization may be based on the requester and/or the target paying a fee for the transaction or service, or preferences. Alternatively or additionally, authorization may be based on privacy rules, such as those defining who can access the information, or preferences, such as those defining a "do not disturb" period between specified times, or when the user is on a specified system, or when the user is at home, etc. In the case of paying a fee, the service provider managing the custom domain 305 may charge for an invite or message, may require subscription, or check successful charging (pre-pay) or check for successful reserve (post pay/credit card payments) or check account status etc. In such a case, the custom location server 245 may, for example, pass a charging request to a charging enabler that generates a charging record to a billing or payment system and check the results.

Figure 4:
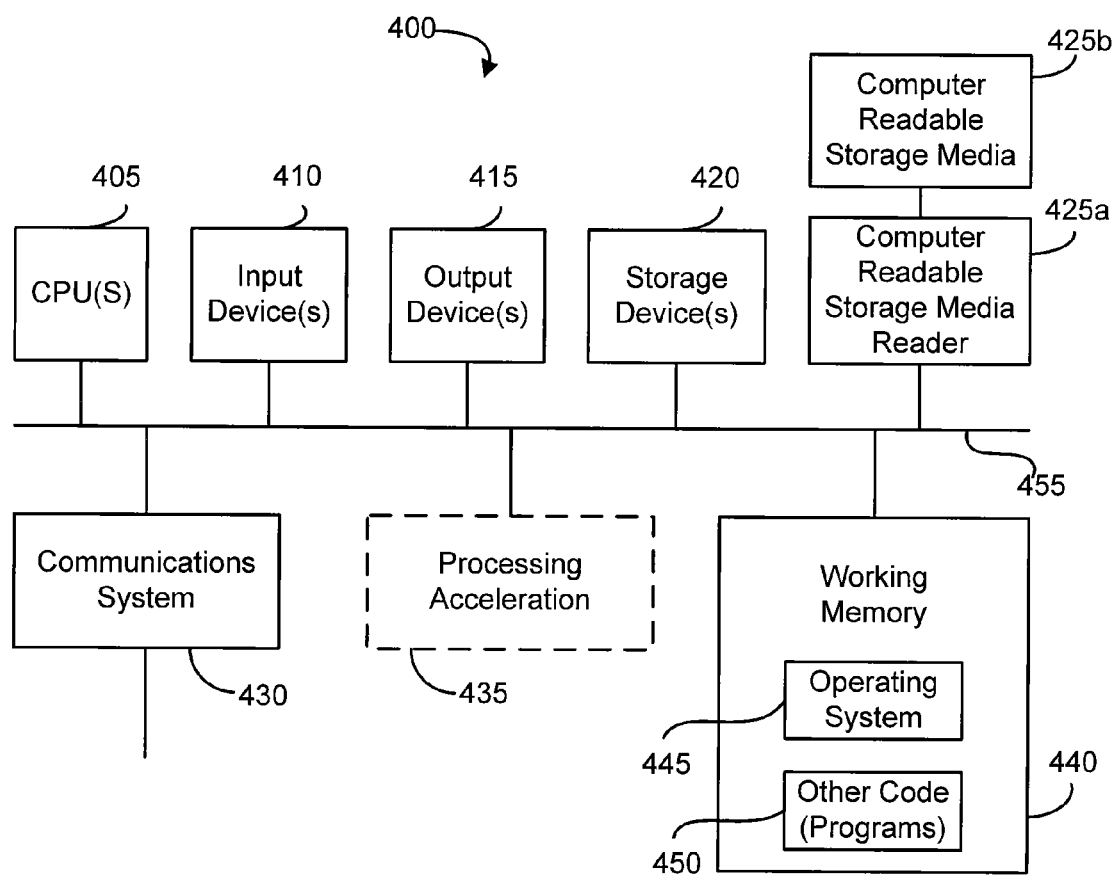
FIG. 4 is a block diagram illustrating an exemplary computer system in which embodiments of the present invention may be implemented.

FIG. 4 illustrates an exemplary computer system 400, in which various embodiments of the present invention may be implemented. The system 400 may be used to implement any of the computer systems described above. The computer system 400 is shown comprising hardware elements that may be electrically coupled via a bus 455. The hardware elements may include one or more central processing units (CPUs) 405, one or more input devices 410 (e.g., a mouse, a keyboard, etc.), and one or more output devices 415 (e.g., a display device, a printer, etc.). The computer system 400 may also include one or more storage device 420. By way of example, storage device(s) 420 may be disk drives, optical storage devices, solid-state storage device such as a random access memory ("RAM") and/or a read-only memory ("ROM"), which can be programmable, flash-updateable and/or the like.

The computer system 400 may additionally include a computer-readable storage media reader 425a, a communications system 430 (e.g., a modem, a network card (wireless or wired), an infra-red communication device, etc.), and working memory 440, which may include RAM and ROM devices as described above. In some embodiments, the computer system 400 may also include a processing acceleration unit 435, which can include a DSP, a special-purpose processor and/or the like.

The computer-readable storage media reader 425a can further be connected to a computer-readable storage medium 425b, together (and, optionally, in combination with storage device(s) 420) comprehensively representing remote, local, fixed, and/or removable storage devices plus storage media for temporarily and/or more permanently containing computer-readable information. The communications system 430 may permit data to be exchanged with the network 420 and/or any other computer described above with respect to the system 400.

The computer system 400 may also comprise software elements, shown as being currently located within a working memory 440, including an operating system 445 and/or other code 450, such as an application program (which may be a client application, web browser, mid-tier application, RDBMS, etc.). It should be appreciated that alternate embodiments of a computer system 400 may have numerous variations from that described above. For example, customized hardware might also be used and/or particular elements might be implemented in hardware, software (including portable software, such as applets), or both. Further, connection to other computing devices such as network input/output devices may be employed. Software of computer system 400 may include code 450 for implementing processes for dynamically providing multimodal and/or multi-device configuration and support.

Generally speaking, providing customized routing of messages can comprise receiving a request to establish a session with a target endpoint at a system for signaling between endpoints. The system can have one or more stored addresses of record for each of a plurality of endpoints. One or more addresses of record for the target endpoint can be determined from the stored addresses of record. One or more policies can be applied to the one or more addresses of record for the target endpoint. The one or more policies can comprise a set of one or more conditions and one or more actions associated with each condition. The request to establish a session with the target endpoint can be routed based on results of applying the one or more policies to the one or more addresses of record for the target endpoint.

Figure 5:
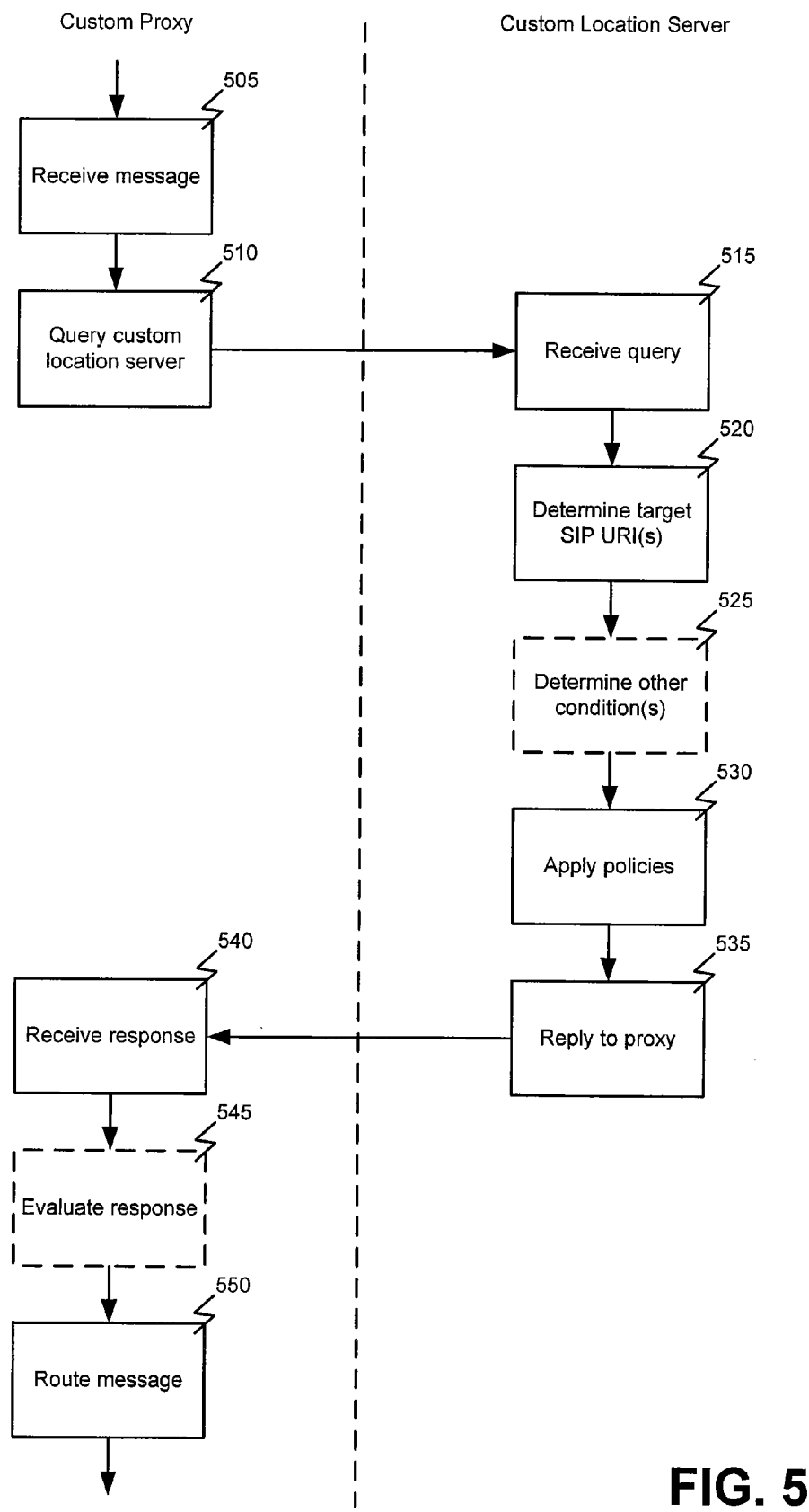
FIG. 5 is a flowchart illustrating, at a high level, a process for customization of routing based on a set of one or more conditions according to one embodiment of the present invention.

FIG. 5 is a flowchart illustrating, at a high level, a process for customization of routing based on a set of one or more conditions according to one embodiment of the present invention. This example illustrates functions that can be performed by a custom proxy and custom location server regardless of whether they are implemented in a modified SIP core as discussed above with reference to FIG. 2 or in a custom domain as discussed above with reference to FIG. 3. As noted above, it should be understood that routing as described herein can be performed for all message types. The exemplary invite or initiation message herein is offered by way of example and not limitation.

In this example, processing begins with receiving 505 a request to establish a session with a target device or endpoint at the custom proxy. The custom proxy then queries 510 the custom location server for target SIP URIs related to the target endpoint indicated by the request.

One or more addresses of record for the target endpoint can be determined 520 from the stored addresses of record by the custom location server. As described above, this is done based on execution policies. Alternatively or additionally, metadata may be stored with the target SIP URI in the custom registrar. Optionally, one or more other conditions can be determined 525. For example, the user's or device's current location can be determined 525 and used as a condition as discussed above. Additionally or alternatively, other conditions such as the user or endpoint being authenticated, authorized, etc. can be determined 525.

One or more policies can be applied 530 to the one or more addresses of record for the target endpoint. As noted above, the one or more policies can comprise a set of one or more conditions and one or more actions associated with each condition. The one or more policies can include one or more conditions based on preferences for a user of the target endpoint, one or more conditions based on calendar information for a user of the target endpoint, one or more conditions based on presence of a user of the target endpoint on the target endpoint or another end device, one or more conditions based on a user of the target endpoint being authenticated, one or more conditions based on a user of the target endpoint being authorized to receive a message, such as by having paid a fee, etc.

After applying 530 the policies to the target SIP URIs, the resulting target SIP URIs can be returned 535 to the custom proxy. Alternatively or additionally, a script or policy to execute may be returned to the custom proxy. The returned information can also indicate if the script or policy is to be persistent for the whole session or is to be disregarded after application. Optionally, the custom proxy may evaluate 545 or handle these target SIP URIs in a manner indicated by the custom location server. That is, rather than simply routing to a discovered target SIP URI returned by the location server, the custom proxy can be adapted to deal with multiple target SIP URIs returned by the custom location serve. For example, the custom location server, after applying policies to the stored target SIP URIs for a particular device may return multiple target SIP URIs to be contacted, perhaps even in a specified order. The custom proxy can be adapted to route messages to each endpoint represented by the target SIP URIs. Finally, the request to establish a session with the target endpoint can be routed 550 based on results of applying the one or more policies to the one or more addresses of record for the target endpoint. As discussed above, it is possible that the policies are applied between the custom proxy and custom location server instead of at the location server or at the proxy.

Figure 6:
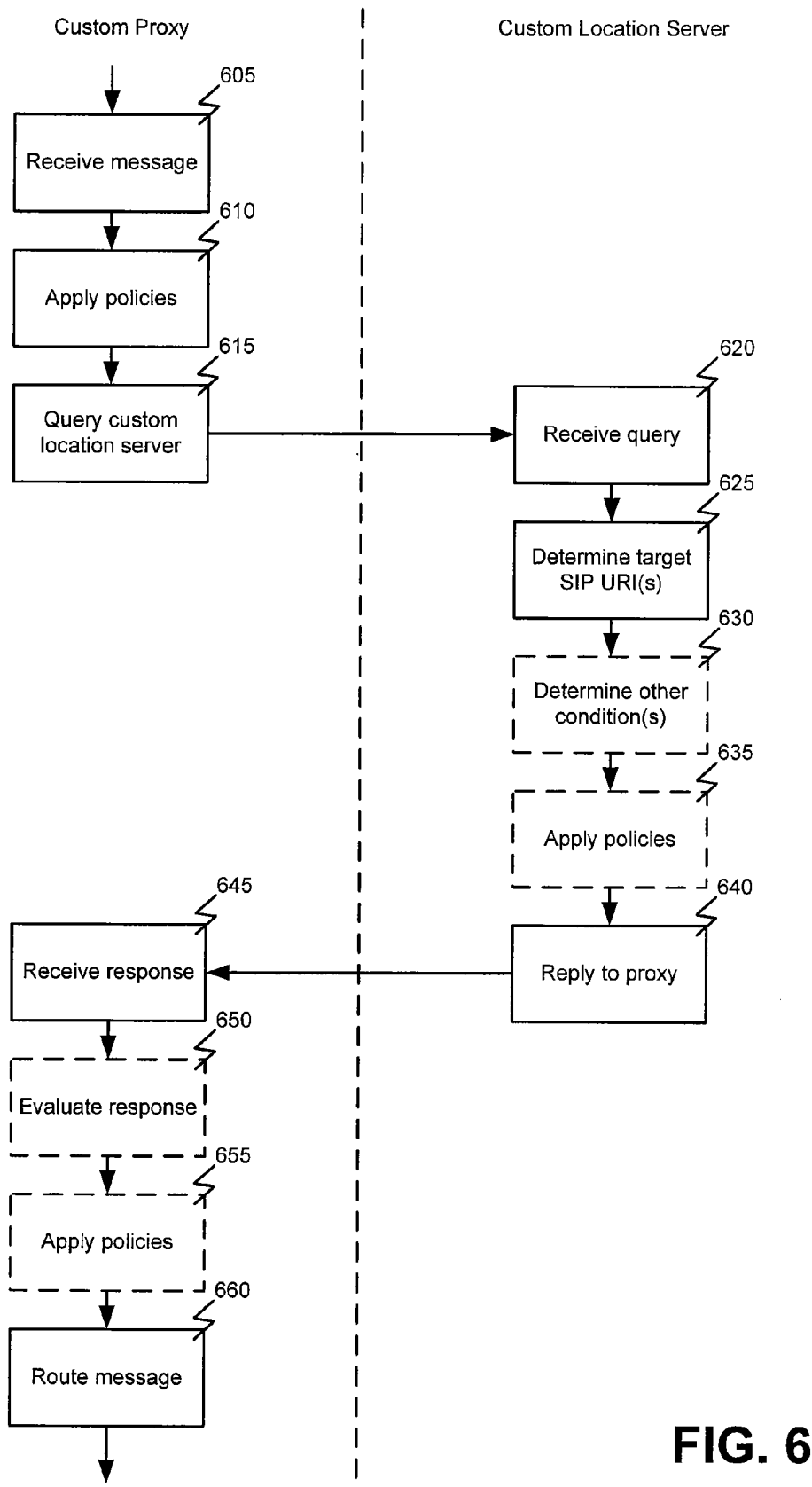
FIG. 6 is a flowchart illustrating a process for customization of routing based on a ser of one or more conditions according to another embodiment of the present invention.

FIG. 6 is a flowchart illustrating, at a high level, a process for customization of routing based on a set of one or more conditions according to another embodiment of the present invention. This example illustrates functions that can be performed by a custom proxy and custom location server regardless of whether they are implemented in a modified SIP core as discussed above with reference to FIG. 2 or in a custom domain as discussed above with reference to FIG. 3. As noted above, it should be understood that routing as described herein can be performed for all message types. The exemplary invite or initiation message herein is offered by way of example and not limitation.

In this example, processing begins with receiving 605 a request to establish a session with a target device or endpoint at the custom proxy. As shown here, any number of policies as discussed above can be applied by the custom proxy. Alternatively of additionally, also as discussed above, other elements of the system may apply one or more policies. The custom proxy then queries 615 the custom location server for target SIP URIs related to the target endpoint indicated by the request.

One or more addresses of record for the target endpoint can be determined 625 from the stored addresses of record by the custom location server. As described above, this is done based on execution policies. Alternatively or additionally, metadata may be stored with the target SIP URI in the custom registrar. Optionally, one or more other conditions can be determined 630. For example, the user's or device's current location can be determined 630 and used as a condition as discussed above. Additionally or alternatively, other conditions such as the user or endpoint being authenticated, authorized, etc. can be determined 630.

Optionally, one or more policies can be applied 635 to the one or more addresses of record for the target endpoint. As noted above, the one or more policies can comprise a set of one or more conditions and one or more actions associated with each condition. The one or more policies can include one or more conditions based on preferences for a user of the target endpoint, one or more conditions based on calendar information for a user of the target endpoint, one or more conditions based on presence of a user of the target endpoint on the target endpoint or another end device, one or more conditions based on a user of the target endpoint being authenticated, one or more conditions based on a user of the target endpoint being authorized to receive a message, such as by having paid a fee, etc.

After applying 635 the policies to the target SIP URIs, the resulting target SIP URIs can be returned 640 to the custom proxy. Alternatively or additionally, a script or policy to execute may be returned to the custom proxy. The returned information can also indicate if the script or policy is to be persistent for the whole session or is to be disregarded after application. Optionally, the custom proxy may evaluate 650 or handle these target SIP URIs in a manner indicated by the custom location server. That is, rather than simply routing to a discovered target SIP URI returned by the location server, the custom proxy can be adapted to deal with multiple target SIP URIs returned by the custom location serve. For example, the custom location server, after applying policies to the stored target SIP URIs for a particular device may return multiple target SIP URIs to be contacted, perhaps even in a specified order.

Also, the custom proxy can be optionally applied one or more policies to the target SIP URLS as discussed above. The custom proxy can be adapted to route messages to each endpoint represented by the target SEP URIs. Finally, the request to establish a session with the target endpoint can be routed 660 based on results of applying the one or more policies to the one or more addresses of record for the target endpoint.

Figure 7:
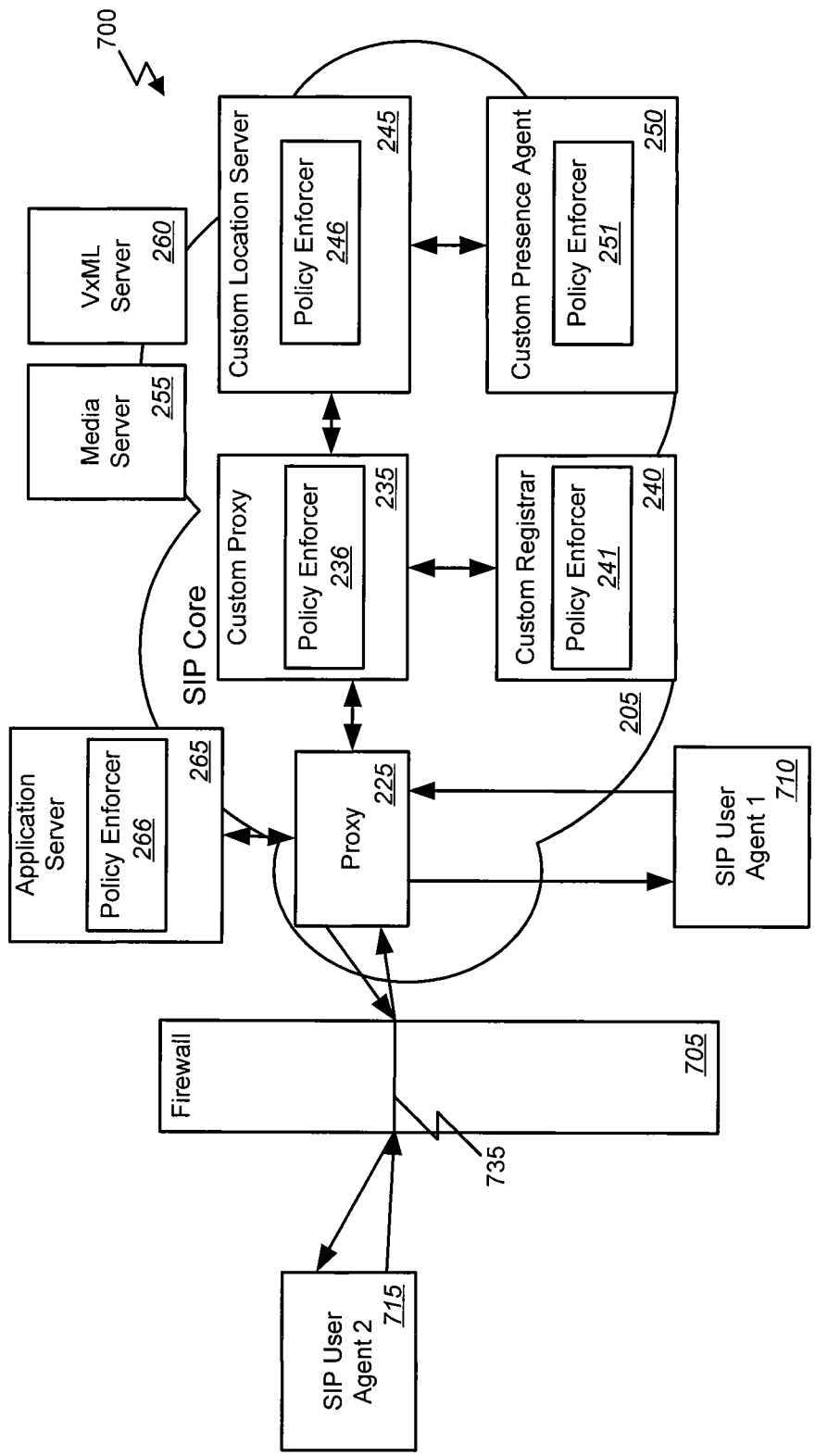
FIG. 7 is a block diagram illustrating functional components of a system for providing customization of routing to pass through a firewall according to one embodiment of the present invention.

FIG. 7 is a block diagram illustrating functional components of a system for providing customization of routing to pass through a firewall according to one embodiment of the present invention. Generally speaking, the system 700 is an adaptation of the system illustrated in FIG. 2 and discussed above. It should be understood that the system illustrated in FIG. 3 and also discussed above can be similarly adapted. That is, either a SIP core that includes a custom proxy or a custom domain that includes a custom proxy can be adapted to provide custom routing of messages to pass through a firewall as will be described below.

In addition to the components discussed above with reference to FIG. 2, the system 700 as illustrated in FIG. 7 also includes a firewall 705. The system 700 also includes one endpoint or user agent 710 "inside" of the firewall 705, i.e., on the same side of the firewall 705 as the SIP Core 205, and one endpoint or user agent 715 "outside" of the firewall 705. It should be understood that only two user agents 710 and 715 are illustrated here for the sake of clarity and that in actual implementations, any number of user agents or endpoints may be present.

In use, one user agent 710 or endpoint may act as an originating endpoint while the other user agent 715 acts as a target endpoint. That is, the originating endpoint or user agent 710 can initiate a communication with the target endpoint or user agent 715 by, for example, sending a SIP INVITE message as discussed above. Furthermore, it should be understood that the labels originator and target represent only the function of the endpoint at a given time and these roles may be reversed at any other time as will be discussed below.

According to one embodiment, the custom proxy 235 can be adapted to receive a message, such as a SIP INVITE message, from the originating user agent 710 to the target user agent 715, via the proxy of the SIP core 205. As discussed above, upon receiving this message, the custom proxy 235 can determine one or more target SIP Uniform Resource Identifiers (URIs) for the target endpoint from stored addresses of record and apply one or more policies to the one or more target SIP Uniform Resource Identifiers (URIs) for the target endpoint to route the message through the firewall 705. That is, based on one or more conditions, the message, message header, etc. can be modified to route the message through an open port of the firewall 705. In this way, the initiating user agent 710 need not be aware of the port used to pass through the firewall 705, thereby enhancing security and ease of use.

The custom proxy 235 can also modify the message to cause a reply to the message to be routed through the same port of the firewall 705. That is, since the port will remain open for a brief period of time to accept a reply, the custom proxy 235 can also modify the message, message header, or other information to identify to the target user agent 715 to which port to reply. In this way, the response can pass through the "pin hole" 735 left open in the firewall 705 by the original message.

The custom proxy 235 can be further adapted to receive the reply to the message via the open port or pin hole 735 in the firewall 705, map the reply to the initiating agent 710, and send the replay to the initiating agent 710. The custom proxy 235 can also be adapted to determine whether a session has been established between the initiating agent 710 and the target user agent 715. In response to determining a session has been established, the custom proxy 235 can switch to a streaming protocol and begin a streaming session between the initiating agent 710 and the target user agent 715 as described, for example, in U.S. patent application Ser. No. 11/512,585 entitled "Cross Network Layer Correlation-Based Firewalls" filed Aug. 29, 2006, the contents of which are incorporated herein in their entirety. The streaming protocol can comprise, for example, Session Description Protocol (SDP), Real-time Transport Protocol (RTP), or another protocol.

Therefore, SIP messages such as an INVITE message and response can be used to establish a streaming session through a firewall 705. Once established, a streaming protocol can be used to support the session. As long as the stream remains active and idle periods in the stream remain less than the allowable duration of the pinhole 735 in the firewall 705, the stream can continue to pass through the firewall 705 without interruption. According to one embodiment, if the stream should be interrupted, a new port can be detected and the stream can be switched to the new port as described herein and in U.S. patent application Ser. No. 11/424,414 entitled "Best Effort Seamless Network Switch in a Streaming Session" filed Jun. 15, 2006, the contents of which are incorporated herein in their entirety.

These steps can be repeated to allow negotiation of the media streams, for example via SDP. In such a case, the SDP exchanges can be adapted by the custom proxy 235 so that both user agents 710 and 715 can use the same ports for both streams. That is, the custom proxy 235 provides forced symmetric media streaming.

In another embodiment, the streaming can be done via RTP. In such a case, an RTP stream can be sent from the initiating agent 710 to the target agent 715. The stream can cross the firewall 705 through its assigned port to be delivered to the target agent 715 which in turn responds with a stream to the initiating agent 710. This return stream can now be treated as a response (client/server) to the request from the initiating agent 710 and therefore allowed to pass through the pin hole 735 in the firewall 705 to the initiating agent 710. As noted above, the pin hole 735 will remain open as long as the initiating agent 710 continues to send RTP packets often enough to prevent closure of the pin hole 735. In such a case, the initiating agent 710 may respond by resending packets to reopen the pinhole 705 in the firewall 705. Alternatively or additionally, the initiating agent 710 may be adapted to periodically send "meaningless" or empty RTP packets mixed in with the RTP stream to keep the pin hole 735 open even if "meaningful" packets, i.e., packets carrying content between the user agents 710 and 715, are temporarily halted or reach a lull.

According to yet another embodiment, the system 700 can include an application server 265 or third-party call controller. Furthermore, in a different scenario, a user agent outside the firewall 705 may initiate a communication via the third-party call controller 265 with a user agent inside of the firewall 705. Therefore, the third-party call controller 265 can be adapted to receive a message, such as a SIP INVITE message, from the originating endpoint or user agent 715 to the target endpoint or user agent 710, determine one or more target SIP Uniform Resource Identifiers (URIs) for the target endpoint 710 from stored addresses of record and apply one or more policies to the one or more target SIP Uniform Resource Identifiers (URIs) for the target endpoint 710 to route the message through the firewall 705. The third-party call controller 265 can apply one or more policies to the one or more network addresses for the target endpoint 710 to route the message through the firewall 705 by modifying the message to route the message through an open port of the firewall 705 and/or by modifying the message to cause a reply to the message to be routed through the same port of the firewall 705 to allow the reply to pass through the pinhole 735 left by the original message.

The third-party call controller 265 can be further adapted to receive the reply to the message via the open port of the firewall, map the reply to the initiating agent 715, and send the replay to the initiating agent 715. The third-party call controller 265 can also be adapted to determine whether a session has been established between the initiating agent 715 and the target agent 710. In response to determining a session has been established, the third-party call controller 265 can switch to a streaming protocol and begin a streaming session between the initiating agent 715 and the target agent 710. The streaming protocol can comprise Session Description Protocol (SDP), Real-time Transport Protocol (RTP), or another protocol.

As noted above, as long as the stream remains active and idle periods in the stream remain less than the allowable duration of the pinhole 735 in the firewall 705, the stream can continue to pass through the firewall 705 without interruption. According to one embodiment, if the stream should be interrupted, a new port can be detected and the stream can be switched to the new port as described herein and in "Best Effort Seamless Network Switch in a Streaming Session" referenced above.

Therefore, the third-party call controller 265 can be adapted to perform some or all of the functions of the initiating user agent 710 as described above. For example, in the case of streaming via RTP, the third-party call controller 265 may be adapted to periodically send "meaningless" or empty RTP packets mixed in with the RTP stream to keep the pin hole 735 open even if "meaningful" packets, i.e., packets carrying content between the user agents 710 and 715, are temporarily halted or reach a lull. Alternatively or additionally, the user agents 710 and 715 may be adapted to drive the exchange as described above. That is, the user agents 710 and 715 may be adapted to invite via other protocols and then to support flow described above.

Figure 8:
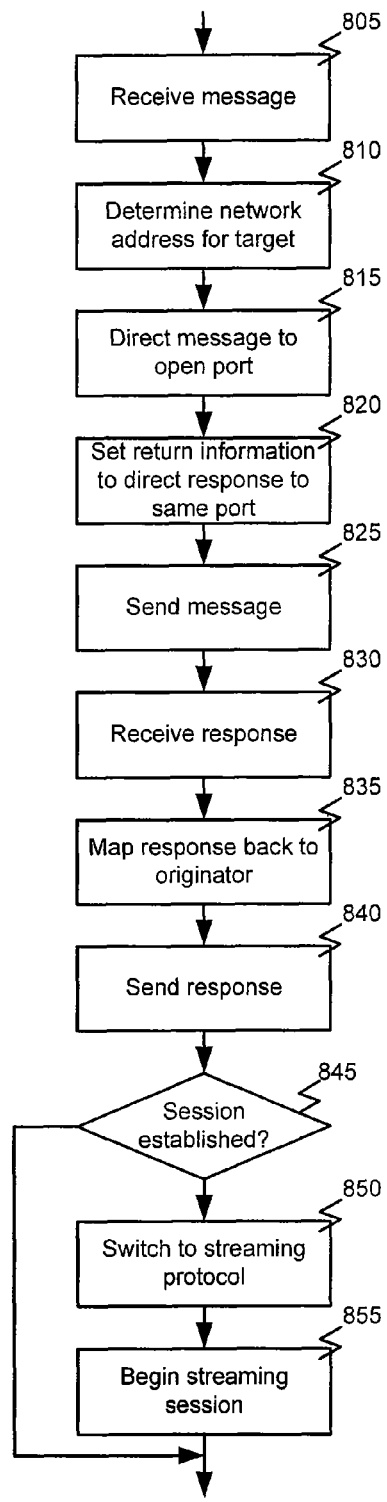
FIG. 8 is a flowchart illustrating a process for customization of routing to pass through a firewall according to one embodiment of the present invention.

FIG. 8 is a flowchart illustrating a process for customization of routing to pass through a firewall according to one embodiment of the present invention. In this example, the process begins with receiving 805 a message from an initiating agent to a target communication identifier or endpoint at a system for signaling between endpoints. Such a message can comprise, for example, a SIP INVITE message.

As noted above, the system can have one or more stored network addresses for each of a plurality of communication identifiers. One or more network addresses for the target endpoint can be determined 810 from the stored network addresses associated to the communication identifier. Furthermore, one or more policies can be applied 815 to the one or more network addresses for the target communication identifier to route the message through the firewall. Applying one or more policies to the one or more network addresses for the target communication identifier to route the message through the firewall can comprise modifying the message to route the message through an open port of the firewall.

Applying one or more policies to the one or more network addresses for the target communication identifier to route the message through the firewall can also comprise modifying 820 the message to cause a reply to the message to be routed through the open port of the firewall. The one or more policies can be applied to the one or more network addresses for the target communication identifier by a customized proxy of the SIP system, a third-party call controller, or other device. The message can then be sent 825 through the open port to the target endpoint.

A reply to the message can be received 830 via the open port of the firewall, and the reply can be mapped 835 back to the initiating agent. The replay can then be sent 840 to the initiating agent. A determination 845 can be made as to whether a session has been established between the initiating agent and the target endpoint. In response to determining 845 a session has been established, a streaming protocol can be switched 850 to and a streaming session can be started 855 between the initiating agent and the target communication identifier.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the invention have been described in detail herein, it is to be understood that the inventive concepts may be otherwise variously embodied and employed, and that the appended claims are intended to be construed to include such variations, except as limited by the prior art.

What is claimed is:

1. A method of providing customized routing of messages to pass through a firewall, the method comprising:
   receiving a message from an initiating agent to a target communication identifier at a system for signaling between endpoints, the system having one or more stored network addresses for each of a plurality of communication identifiers;
   determining one or more network addresses for the target endpoint from the stored network addresses associated to the communication identifier; and
   applying one or more policies to the one or more network addresses for the target endpoint to route the message through the firewall based on the determined one or more network addresses and one or more actions defined in the applied one or more policies, wherein applying one or more policies to the one or more network addresses for the target endpoint comprises changing the at least one of the one or more network addresses for the target endpoint based on one or more conditions defined in the applied one or more policies and producing a script comprising the one or more network addresses, a port address of an open port of the firewall, and instructions associated with each of the one or more network addresses, the instructions of the script comprising at least one condition and at least one action associated with each condition and affecting further routing of the message based on satisfaction of the associated condition.

2. The method of claim 1, wherein applying one or more policies to the one or more network addresses for the target communication identifier to route the message through the firewall comprises modifying the message to route the message through the open port of the firewall based on the addresses and associated conditions and actions of the script.

3. The method of claim 2, wherein applying one or more policies to the one or more network addresses for the target communication identifier to route the message through the firewall comprises modifying the message to cause a reply to the message to be routed through the open port of the firewall.

4. The method of claim 1, wherein the system for signaling between endpoints comprises a Session Initiation Protocol (SIP) system.

5. The method of claim 4, wherein the message comprises a SIP INVITE message.

6. The method of claim 4, wherein applying one or more policies to the one or more network addresses for the target communication identifier is performed by a customized proxy of the SIP system.

7. The method of claim 4, wherein applying one or more policies to the one or more network addresses for the target communication identifier is performed by a third-party call controller.

8. The method of claim 3, further comprising:
   receiving the reply to the message via the open port of the firewall;
   mapping the reply to the initiating agent; and
   sending the replay to the initiating agent.

9. The method of claim 8, further comprising determining whether a session has been established between the initiating agent and the target communication identifier.

10. The method of claim 9, further comprising, in response to determining a session has been established, switching to a streaming protocol and beginning a streaming session between the initiating agent and the target communication identifier.

11. The method of claim 10, wherein the streaming signaling protocol comprises Session Description Protocol (SDP).

12. The method of claim 10, wherein the streaming session comprises Real-time Transport Protocol (RTP).

13. A Session Initiation Protocol (SIP) system for providing customized routing of messages, the system comprising:
   a target endpoint;
   an originating endpoint communicatively coupled with the target endpoint;
   a firewall between the target endpoint and the originating endpoint; and
   a custom proxy communicatively coupled with the target endpoint and the originating endpoint and adapted to receive a message from the originating endpoint to the target endpoint, determine one or more target SIP Uniform Resource Identifiers (URIs) for the target endpoint from stored addresses of record and apply one or more policies to the one or more target SIP Uniform Resource Identifiers (URIs) for the target endpoint to route the message through the firewall, wherein applying the one or more policies comprises modifying at least one of the determined one or more target SIP URIs based on one or more conditions and one or more actions defined in the applied one or more policies and a port address of the firewall and wherein changing the one or more target SIP URIs for the target endpoint comprises producing a script of SIP URIs, the SIP URIs including a URI for an open port of the firewall and the script further comprising instructions associated with each of the SIP URIs, the instructions of the script comprising at least one condition and at least one action associated with each condition and affecting further routing of the message based on satisfaction of the associated condition.

14. The system of claim 13, wherein the custom proxy applies one or more policies to the one or more network addresses for the target communication identifier to route the message through the firewall by modifying the message to route the message through the open port of the firewall based on the SIP URIs and associated conditions and actions of the script.

15. The system of claim 14, wherein the custom proxy applies one or more policies to the one or more network addresses for the target endpoint to route the message through the firewall by modifying the message to cause a reply to the message to be routed through the open port of the firewall.

16. The system of claim 13, wherein the message comprises a SIP INVITE message.

17. The system of claim 15, wherein the custom proxy is further adapted to receive the reply to the message via the open port of the firewall, map the reply to the initiating agent, and send the replay to the initiating agent.

18. The system of claim 17, wherein the custom proxy is further adapted to determine whether a session has been established between the initiating agent and the target endpoint.

19. The system of claim 18, wherein the custom proxy is further adapted to, in response to determining a session has been established, switch to a streaming protocol and begin a streaming session between the initiating agent and the target endpoint.

20. The system of claim 19, wherein the signaling protocol comprises Session Description Protocol (SDP).

21. The system of claim 19, wherein the streaming session comprises Real-time Transport Protocol (RTP).

22. A Session Initiation Protocol (SIP) system for providing customized routing of messages, the system comprising:
a target endpoint;
an originating endpoint communicatively coupled with the target endpoint;
a firewall between the target endpoint and the originating endpoint; and
a third-party call controller communicatively coupled with the target endpoint and the originating endpoint and adapted to receive a message from the originating endpoint to the target endpoint, determine one or more target SIP Uniform Resource Identifiers (URIs) for the target endpoint from stored addresses of record and apply one or more policies to the one or more target SIP Uniform Resource Identifiers (URIs) for the target endpoint to route the message through the firewall based on the determined one or more target SIP URIs and one or more actions defined in the applied one or more policies, wherein applying one or more policies to the one or more network addresses for the target endpoint comprises changing at least one of the one or more target SIP URIs for the target endpoint based on one or more conditions defined in the applied one or more policies and producing a script comprising the one or more SIP URIs, the SIP URIs including a URI for an open port address of the firewall and the script further comprising instructions associated with each of the SIP URIs, the instructions of the script comprising at least one condition and at least one action associated with each condition and affecting further routing of the message based on satisfaction of the associated condition.

23. The system of claim 22, wherein the third-party call controller applies one or more policies to the one or more network addresses for the target endpoint to route the message through the firewall by modifying the message to route the message through the open port of the firewall based on the SIP URIs and associated conditions and actions of the script.

24. The system of claim 23, wherein the third-party call controller applies one or more policies to the one or more network addresses for the target endpoint to route the message through the firewall by modifying the message to cause a reply to the message to be routed through the open port of the firewall.

25. The system of claim 22, wherein the message comprises a SIP INVITE message.

26. The system of claim 23, wherein the third-party call controller is further adapted to receive the reply to the message via the open port of the firewall, map the reply to the initiating agent, and send the replay to the initiating agent.

27. The system of claim 26, wherein the third-party call controller is further adapted to determine whether a session has been established between the initiating agent and the target endpoint.

28. The system of claim 27, wherein the third-party call controller is further adapted to, in response to determining a session has been established, switch to a streaming protocol and begin a streaming session between the initiating agent and the target endpoint.

29. The system of claim 28, wherein the signaling protocol comprises Session Description Protocol (SDP).

30. The system of claim 28, wherein the streaming session comprises Real-time Transport Protocol (RTP).

31. The method of claim 1, wherein changing the one or more network addresses for the target endpoint further comprises adding the script of network addresses and associated conditions and actions to the message.

* * * * *

UNITED STATES PATENT AND TRADEMARK OFFICE
CERTIFICATE OF CORRECTION

PATENT NO. : 8,571,012 B2  Page 1 of 1
APPLICATION NO. : 11/428955
DATED : October 29, 2013
INVENTOR(S) : Maes It is certified that error appears in the above-identified patent and that said Letters Patent is hereby corrected as shown below:

In the Specification

Column 4, line 6, delete "ser" and insert -- series --, therefor.

Column 7, line 50, delete "(PTSN)" and insert -- (PSTN) --, therefor.

Column 9, line 10, delete "includes" and insert -- include --, therefor.

Column 11, line 22, delete "(PTSN)" and insert -- (PSTN) --, therefor.

Column 13, line 7, delete "includes" and insert -- include --, therefor.

Signed and Sealed this
Third Day of June, 2014

Michelle K. Lee
*Deputy Director of the United States Patent and Trademark Office*